(12) United States Patent
Yang et al.

(10) Patent No.: US 9,285,922 B2
(45) Date of Patent: Mar. 15, 2016

(54) TOUCH STACK-UP STRUCTURE

(75) Inventors: Lichun Yang, Xiamen (CN); Mingyuan Hong, Xiamen (CN); Chunyong Zhang, Fuzhou (CN); Congming Chen, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 876 days.

(21) Appl. No.: 13/437,000

(22) Filed: Apr. 2, 2012

(65) Prior Publication Data

US 2013/0063820 A1 Mar. 14, 2013

(30) Foreign Application Priority Data

Sep. 9, 2011 (CN) .......................... 2011 1 0279284

(51) Int. Cl.
 *G06F 3/042* (2006.01)
 *G06F 3/044* (2006.01)
 *G02F 1/1333* (2006.01)

(52) U.S. Cl.
 CPC ............... *G06F 3/042* (2013.01); *G06F 3/044* (2013.01); *G02F 1/13338* (2013.01); *Y10T 156/10* (2015.01)

(58) Field of Classification Search
 CPC ... H04N 2005/443; G06F 3/042; G06F 3/044; G02F 1/13338; Y10T 156/10
 USPC .................................................. 359/577–590
 See application file for complete search history.

(56) References Cited

U.S. PATENT DOCUMENTS

| | | | |
|---|---|---|---|
| 4,828,346 A * | 5/1989 | Jacobsen et al. | 359/360 |
| 2004/0065968 A1* | 4/2004 | Klemm et al. | 264/2.5 |
| 2004/0157044 A1* | 8/2004 | Kang et al. | 428/141 |
| 2008/0231957 A1* | 9/2008 | Terayama | 359/586 |
| 2010/0073764 A1* | 3/2010 | Kai et al. | 359/359 |
| 2010/0297365 A1* | 11/2010 | Curd | 428/1.1 |

FOREIGN PATENT DOCUMENTS

| | | |
|---|---|---|
| CN | 1636914 | 7/2005 |
| CN | 101055321 | 10/2007 |
| JP | 2004013692 | 1/2004 |
| JP | 2006011523 | 1/2006 |
| JP | 2006031590 | 2/2006 |
| JP | 2008243622 | 10/2008 |
| JP | 2009053893 | 3/2009 |
| JP | 2010086684 | 4/2010 |
| TW | 200923536 | 6/2009 |

* cited by examiner

*Primary Examiner* — Kimberly N Kakalec
(74) *Attorney, Agent, or Firm* — Gokalp Bayramoglu

(57) ABSTRACT

The present disclosure provides a touch stack-up structure, which can be applied in a touch panel to make the panel have excellent appearance and reliability. An embodiment of the present disclosure provides a touch stack-up structure that comprises sequentially forming a patterned transparent conductive layer, a first transparent insulation layer with low refractive index, a second transparent insulation layer with high refractive index, and an optical clear adhesive on a transparent substrate.

14 Claims, 3 Drawing Sheets

TOUCH STACK-UP STRUCTURE

This Application claims the benefit of the People's Republic of China Application No. 201110279284.9, filed on Sep. 9, 2011.

BACKGROUND OF THE INVENTION

1. Field of the Invention

The present disclosure relates to a touch technology. More particularly, the present disclosure relates to a touch stack-up structure and an application thereof in a touch panel.

2. Description of the Related Art

In recent years, touch panels integrated with touch technology and display technology have become popular and are applied in electronic devices as both input and display devices. Touch panels are typically classified into two types: on cell touch panels and in cell touch panels. An on cell touch panel comprises of a touch device and a display device, wherein the touch device is normally provided with a transparent surface touch screen facing towards a user. The user gives a command for controlling an electronic device through an icon or instruction that is shown on the touch screen. On the other hand, the bottom portion of the touch screen is provided with a transparent substrate, wherein surface of the transparent substrate that faces towards the touch screen has multiple wires made of transparent conductive materials such as tin indium oxide (ITO) wires, and these wires are used for detecting touch positions of the user. In an in cell touch panel, on the other hand, a touch sensor is physically inside a cell such as a LCD cell. Touch sensor used in the in-cell touch panel can include Light-sensing photo-transistors (optical), micro-switches (switch-sensing), and capacitance-sensing electrodes (capacitive).

However, while a touch device is integrated with a display device, a user can see and distinguish between a touch area with wires and a touch area without wires through a touch screen, thereby deteriorating appearance of a touch panel.

SUMMARY OF THE INVENTION

In view of this, an object of the present disclosure is to provide a touch stack-up structure. The touch stack-up structure adopts multilayer films with different refractive indexes to make reflectivity difference between an area with conductive layer and an area without conductive layer dramatically reduce, so as to improve appearance of a touch panel.

An embodiment of the present disclosure provides a touch stack-up structure comprising of a conductive layer, a first refractive index layer located on the conductive layer, a second refractive index layer located on the first refractive index layer, wherein refractive index of the first refractive index layer is lower than refractive index of the conductive layer and refractive index of the second refractive index layer is higher than refractive index of the first refractive index layer.

The present disclosure, according to the optical interference principles, by means of installing the first refractive index layer and the second refractive index layer in the touch stack-up structure, makes reflectivity difference between a touch area with a conductive layer and a touch area without a conductive layer dramatically reduce. Also, by means of choosing appropriate materials and designing refractive index layers of reasonable thickness, reflectivity difference is further reduced, which leads to improved appearance of a touch panel. The first refractive index layer and the second refractive index layer are also used as insulation layer at the same time.

DETAILED DESCRIPTION OF THE EMBODIMENTS

Figure 1:
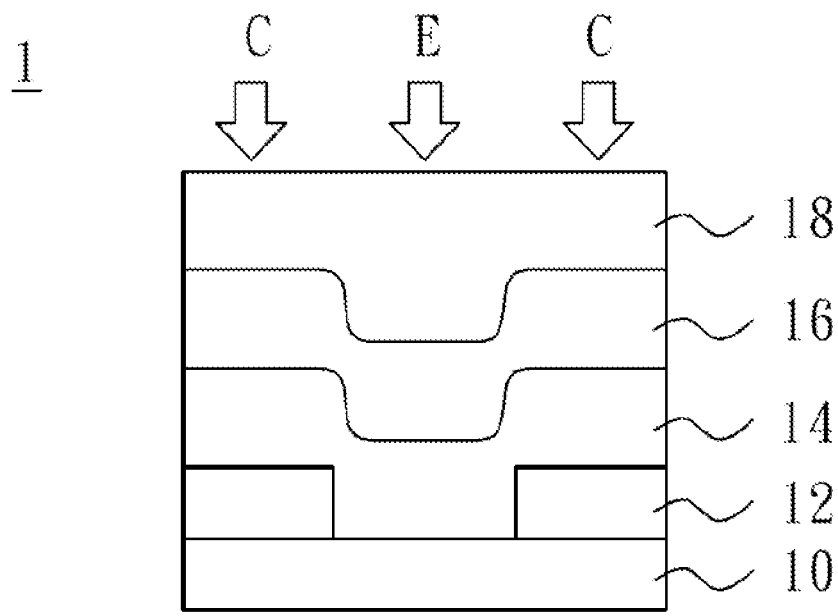
FIG. 1 is a section view schema of a touch stack-up structure in accordance with an embodiment of the present disclosure.

Following description describes each embodiment of the present disclosure with drawings as an example. Apart from the embodiment described herein, the present disclosure can also be widely applied in other embodiments and any easy replacement, modification and equivalent changes of the embodiments are all included into the scope of the present disclosure, and also subject to following appended claims. In the present description, specific details are provided to readers to have a complete understanding of the present disclosure. However, the present disclosure may still be implemented under the precondition of omitting part or all of the specific details. Moreover, well-known steps and components are not described in the details to avoid causing unnecessary limit to the present disclosure. The same or suspected components in the drawings shall be denoted by same or suspected symbols. To be specially noticed that, the drawing is only for indicating, not presenting the real size or quantity of the components, unless otherwise specified.

FIG. 1 is a section view schema of a touch stack-up structure in accordance with an embodiment of the present disclosure. The touch stack-up structure 1 comprises of: a conductive layer 12, a first refractive index layer 14 located on the conductive layer 12 and overlaid on the conductive layer 12, wherein refractive index of the first refractive index layer 14 is lower than refractive index of the conductive layer 12, a second refractive index layer 16 located on the first refractive index layer 14 and overlaid on the first refractive index layer 14, wherein refractive index of the second refractive index layer 16 is higher than refractive index of the first refractive index layer 14.

The touch stack-up structure 1 can also comprise a third refractive index layer 18 located on the second refractive index layer 16, wherein refractive index of the third refractive index layer 18 is lower than refractive index of the second refractive index layer 16.

In an embodiment, the first refractive index layer 14 and the second refractive index layer 16 are used as insulation layers at the same time, and the third refractive index layer 18 is used as a bonding layer, which is made up of optically clear adhesive (OCA) or water based adhesive, wherein all the refractive index layers 14, 16, and 18 are transparent.

Continually, in the present embodiment, the conductive layer 12 performs patterning, the materials thereof are transparent conductive materials such as indium tin oxide (ITO), or other materials such as antimony tin oxide (ATO), zinc oxide (ZnO), zinc dioxide ($ZnO_2$), tin dioxide ($SnO_2$), indium trioxide ($In_2O_3$) or combinations thereof.

Touch stack-up structure 1 is formed on a substrate 10, wherein the substrate 10 is made of transparent materials, particularly but not limited to polyethyleneterephthalate (PET), glass, polycarbonate (PC), polymethylmethacrylate (PMMA) etc.

In addition, in the present embodiment, the first refractive index layer 14 has lower refractive index while the second refractive index layer 16 has higher refractive index. Preferably, the first refractive index layer 14 is an oxide such as silicon dioxide ($SiO_2$), with the refractive index thereof being between 1.38 and 1.52; the second refractive index layer 16 is an oxide or nitride such as niobium pentoxide ($Nb_2O_5$) or silicon nitride ($SiN_x$), with the refractive index thereof being between 1.70 and 2.30. Preferably, thickness of the first refractive index layer 14 is between 20 nm and 80 nm, and thickness of the second refractive index layer 16 is between 5 nm and 20 nm.

In addition, the third refractive index layer 18 has a lower refractive index when compared to that of the second refractive index layer 16. Refractive index of the third refractive index layer 18 is between 1.38 and 1.52.

In addition, if the third refractive index layer 18 is an optical clear adhesive, the third refractive index layer 18 can provide laminations of every type of substrate or film. Moreover, even if the third refractive index layer 18 is exposed to high-temperature and high-humidity environment, it still can make the laminating layer have features of contaminant-free and bubble resistance.

Aforesaid touch stack-up structure 1 can be applied in a touch panel. As shown in FIG. 1, when the touch stack-up structure 1 is applied in the touch panel, a display device (Not shown in drawings) is set under the substrate 10. C and E respectively represent a conductive area and an etching area under observing direction of a user, wherein the conductive area C is formed by the conductive layer 12, and the etching area E represents an area in which the conductive layer 12 has been removed through etching. The present disclosure, according to optical interference principles, by means of reasonable design of the first refractive index layer 14 and the second refractive index layer 16, makes the difference between refractive indexes of the conductive area C and the etching area E dramatically reduce. Thus, it would be difficult for a user to distinguish between the conductive area C and the etching area E, as the appearance of touch panel is improved. On the other hand, the first refractive index layer 14 and the second refractive index layer 16 can resist corrosion to the conductive layer 12 by the optical clear adhesive (third refractive index layer), thereby increasing the reliability of the touch panel. Meanwhile, the optical clear adhesive is overlaid on the second refractive index layer 16, thereby forming a three-layer structure with the first refractive index layer 14, wherein the optical clear adhesive can further reduce the difference between the refractive indexes of the conductive area C and the etching area E.

Figure 2:
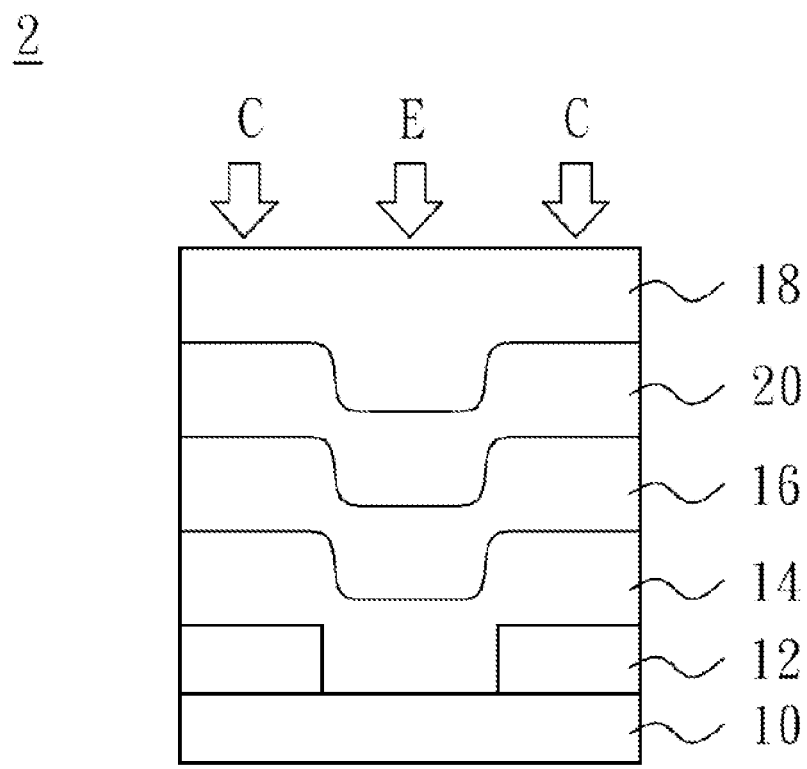
FIG. 2 is a section view schema of a touch stack-up structure in accordance with another embodiment of the present disclosure.

FIG. 2 is a section view schema of a touch stack-up structure 2 in accordance with another embodiment of the present disclosure, and its difference with FIG. 1 embodiment is that the touch stack-up structure 2 of the present embodiment has at least one extra organic protective layer 20 (passivation), which is located in between of second refractive index layer 16 and third refractive index layer 18. Material of the organic protective layer 20 includes but is not limited to polyethyleneterephthalate (PET), polyphenylene sulfide (PPS) and polypropylene.

Figure 3:
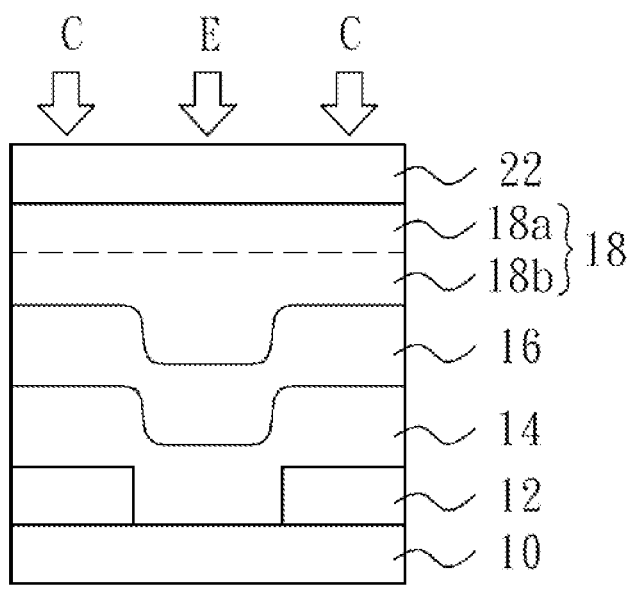
FIG. 3 is a section view schema of a touch stack-up structure in accordance with another embodiment of the present disclosure.

FIG. 3 is a section view schema of a touch stack-up structure 3 in accordance with another embodiment of the present disclosure, and its difference with FIG. 1 embodiment is that the touch stack-up structure 3 of the present embodiment has one extra covering layer 22 located on an optical clear adhesive. Furthermore, the optical clear adhesive has a first part 18a and a second part 18b, wherein the first part 18a and the second part 18b are separately laminated with the covering layer 22 and the second refractive index layer 16. In between the optical clear adhesive and covering layer 22, can also be set with at least a layer of other refractive index layer or organic protective layer.

In the present embodiment, material of the covering layer 22 can be glass or plastic (high polymer), while the optical clear adhesive can be made of a composite material (pressure-sensitive adhesive), namely, by virtue of putting an appropriate pressure, such as by using a roller for pressing, the optical clear adhesive can be generated by adhesion and be laminated with the laminating layer. In addition, it is possible to use an optical clear adhesive with refractive index close to refractive index of the laminating layer. For example, if the material of the covering layer 22 is an ordinary glass, refractive index of the covering layer 22 is approximately equal to 1.5, the optical clear adhesive with a refractive index of close to 1.5 can be used.

In the present embodiment, material of the covering layer 22 and of the second refractive index layer 16 may be provided with different phase and heterogeneity, namely, the covering layer 22 and the second refractive index layer 16 may have diverse physical and chemical characteristics. The first part 18a of the optical clear adhesive is applicable for lamination with the covering layer 22 while the second part 18b is applicable for lamination with the second refractive index layer 16. Preferably, the first part 18a and the second part 18b can separately be integrated by same or diverse monomers and characteristic thereof is that both the parts have diverse cross-linking density to form an integration of body.

Figure 4:
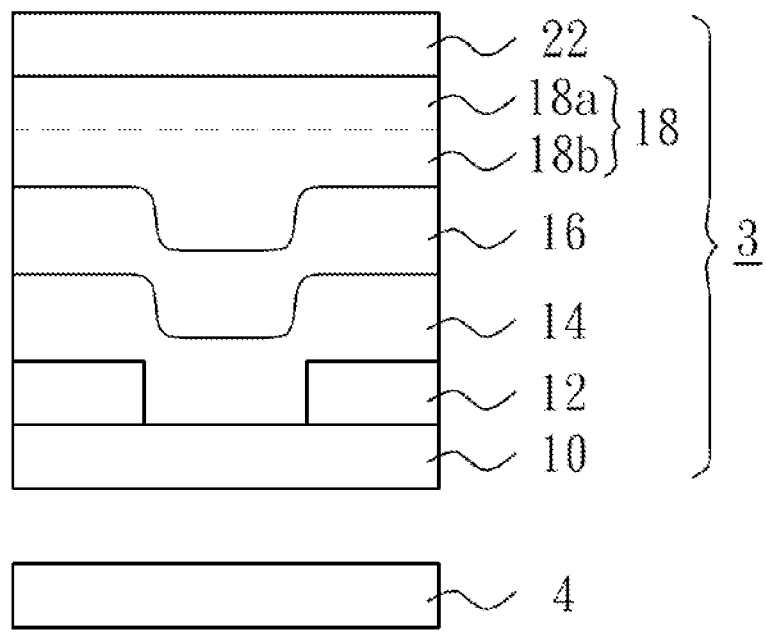
FIG. 4 shows a touch panel in accordance with another embodiment of the present disclosure.

FIG. 4 shows a touch panel in accordance with another embodiment of the present disclosure, wherein FIG. 4 comprises of a touch device, which is acted by a touch stack-up structure 3 as shown in FIG. 3 and a display device 4 located under the touch device 3, wherein the display device 4 includes a liquid crystal display, an organic light-emitting diode (OLED) display, and an electroluminescent (EL) display and the like. Hereby, the touch device 3 and the display device 4 constitute an on cell touch panel.

Figure 5:
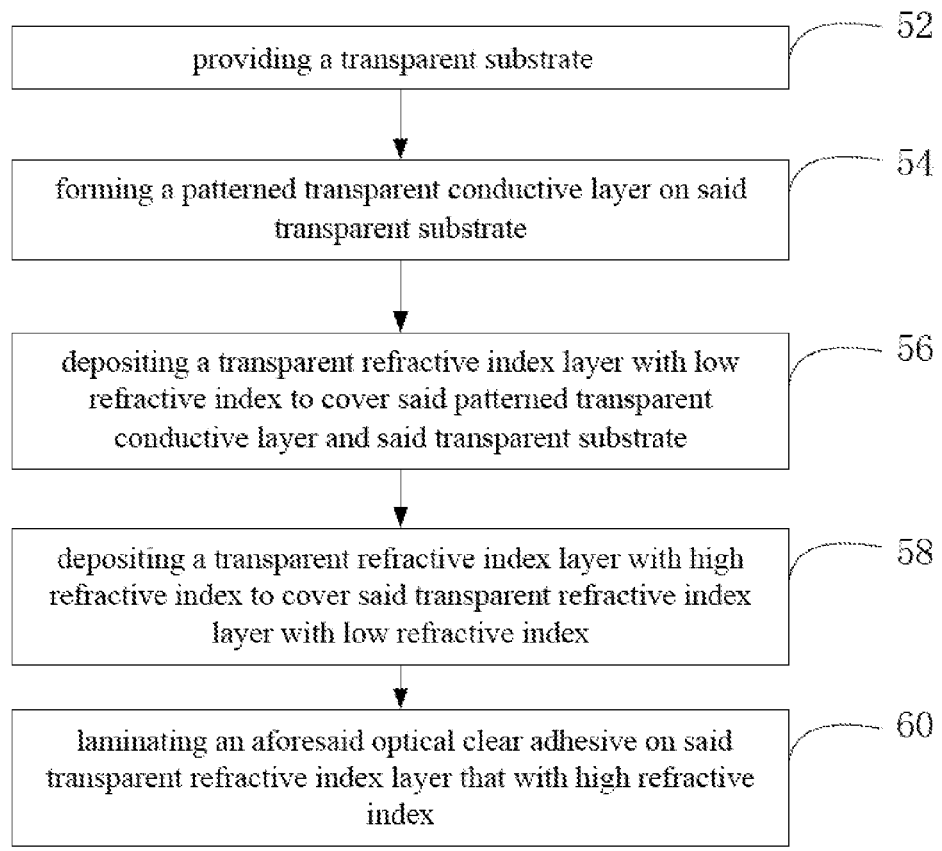
FIG. 5 shows a formation method for a touch stack-up structure in accordance with another embodiment of the present disclosure.

FIG. 5 shows formation method for a touch stack-up structure in accordance with another embodiment of the present disclosure. At step 52, a transparent substrate, such as polyethyleneterephthalate (PET) substrate is provided. At step 54, a patterned transparent conductive layer is formed on the transparent substrate, wherein by using a roll to roll sputtering device, an ITO transparent conductive layer is deposited on the rolled PET. After that, based on the specification of an exposure machine, the rolled PET, which has the ITO transparent conducive layer, is cut into a required size, for example, the rolled PET is cut into a 355 mm×406 mm sheet. Then, the ITO transparent conductive layer is patterned through micro-lithography process. At step 56, a transparent refractive index layer with a low refractive index is deposited to cover the patterned transparent conductive layer and the transparent substrate, for example, by using a screen printing process to cover the area on the patterned ITO transparent conductive layer, which is required for bonding by strippable adhesive. After that, the sputtering device can be used to deposit a transparent refractive index layer with a low refractive index on the patterned ITO transparent conductive layer, and preferably, wherein the transparent refractive index layer can be an oxide such as $SiO_2$, with a refractive index between 1.38 to 1.52. At step 58, a transparent refractive index layer with a high refractive index is deposited to cover the transparent refractive index layer with low refractive index. Fox example, the sputtering device can be used to deposit a transparent refractive index layer with a high refractive index on the transparent conductive layer with a low refractive index, and preferably, the transparent refractive index layer with high refractive index can be an oxide or nitride such as $Nb_2O_5$ or $SiN_X$ with refractive index between 1.70 to 2.30. Then, the strippable adhesive can be peeled off. At step 60, an aforesaid optical clear adhesive can be laminated on the transparent refractive index layer with high refractive index, thereby completing the touch stack-up structure.

Continually, another embodiment of the present disclosure discloses a touch stack-up structure comprising laminating an aforesaid transparent covering layer on the optical clear adhesive through the optical clear adhesive.

Firstly, an ITO transparent conductive layer, having a thickness of approximately 40 nm, is deposited on a PET roll material, and cut into 355 mm×406 mm pieces. The ITO transparent conductive layer is then patterned with a microlithography process, after which the strippable adhesive is utilized to shield a preparative bonding area with a screen printing process, and then, the reactive sputtering deposition is utilized to deposit a layer thickness of 36 nm of SiO2 film on the patterned ITO transparent conductive layer, and to further deposit a layer of Nb2O5, having a thickness of 9 nm. The strippable adhesive can then be peeled off. An optical clear adhesive can be laminated on the Nb2O5 layer and a transparent covering layer can be laminated on the optical clear adhesive to complete a touch stack-up structure. Lastly, the touch stack-up structure is utilized to manufacture a touch panel.

Figure 6:
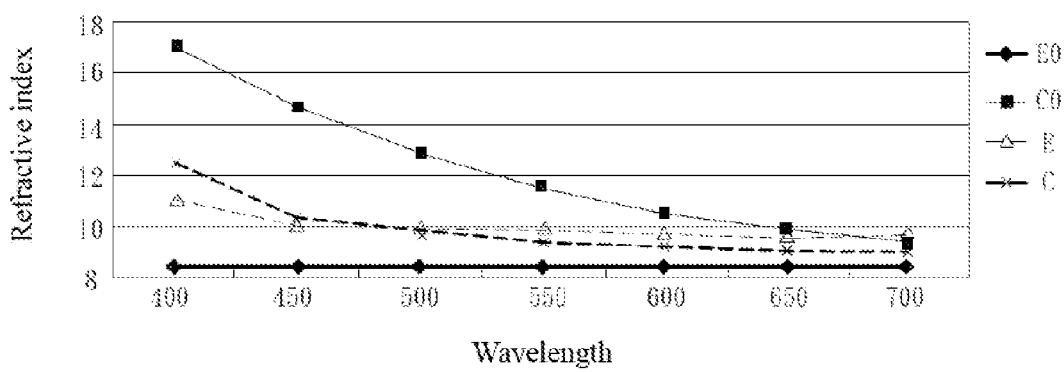
FIG. 6 shows two refractive index curves of touch stack-up structures that are located in an etching area and reflection area after being made into touch panel, in accordance with an embodiment of the present disclosure and a contrast.

FIG. 6 shows two refractive index curves of touch stack-up structures, which are separately located in an etching area and a reflection area after being made into a touch panel, in accordance with an embodiment of the present disclosure. The embodiment further discloses a contrast. Except the two transparent refractive index layers, structure of said contrast is same as aforesaid embodiment. Moreover, curves E0 and C0 are refractive index curves of the touch panel that separately reflect the behavior of the etching area and the conductive area in accordance with the contrast. As shown in drawings, with reference to the contrast, difference between the refractive indexes of E0 and C0 is large, and thus the conductive area C0 and the etching area E0 can be easily distinguished by observation of human eye. With reference to the present embodiment, difference between the refractive indexes of E0 and C0 is small, and therefore it is hard to distinguish the conductive area C and the etching area E by observation of the human eye.

Foregoing description is only a preferred embodiment of the present disclosure, and is therefore not intended to limit the scope of the disclosure. It is apparent to those skilled in the art that a variety of modifications and changes may be made without departing from the scope of the present disclosure, which is intended to be defined by the appended claims.

It should be noted that each of the exemplary embodiments of the touch stack-up structure described here could easily be modified by applying a different material for conducting layer, refractive index layers, and adhesive.

What is claimed is:

1. A touch stack-up structure comprising:
   a conductive layer;
   a first refractive index layer that covers the conductive layer;
   a second refractive index layer located on the first refractive index layer, wherein a refractive index of the first refractive index layer is lower than the refractive index of the conductive layer, and wherein the refractive index of the second refractive index layer is higher than the refractive index of the first refractive index layer, wherein the first refractive index layer with a lower refractive index than the second refractive index layer is located between the conductive layer and the second refractive index layer;
   a third refractive index layer directly located on the second refractive index layer, wherein the refractive index of the third refractive index layer is lower than the refractive index of the second refractive index layer; and
   a covering layer located on the third refractive index layer;
   wherein the third refractive index layer has a first part and a second part, the first part and the second part have different cross-linking densities, wherein the first part is applicable for lamination with the covering layer made of glass and the second part is applicable for lamination with the second refractive index layer made of niobium pentoxide ($Nb_2O_5$) or silicon nitride ($SiN_X$).

2. The touch stack-up structure as claimed in claim 1, wherein the refractive index of the first refractive index layer is between 1.38 and 1.52.

3. The touch stack-up structure as claimed in claim 1, wherein the refractive index of the second refractive index layer is between 1.70 and 2.30.

4. The touch stack-up structure as claimed in claim 1, wherein each of the first refractive index layer and the second refractive index layer is an insulation layer.

5. The touch stack-up structure as claimed in claim 1, wherein the first refractive index layer is made of silicon dioxide ($SiO_2$).

6. The touch stack-up structure as claimed in claim 1, wherein a thickness of the first refractive index layer is between 20 nm and 80 nm, and the thickness of the second refractive index layer is between 5 nm and 20 nm.

7. The touch stack-up structure as claimed in claim 1, wherein the refractive index of the third refractive index layer is between 1.38 and 1.52.

8. The touch stack-up structure as claimed in claim 1, wherein said third refractive index layer is a bonding layer made up of an optically clear adhesive or a water based adhesive.

9. The touch stack-up structure as claimed in claim 1, wherein the third refractive index layer, the second refractive index layer and the first refractive index layer are formed in that order on a substrate.

10. The touch stack-up structure as claimed in claim 9, wherein the substrate comprises polyethyleneterephthalate, glass, polycarbonate, or polymethylmethacrylate.

11. The touch stack-up structure as claimed in claim 1, wherein the conductive layer is made of indium tin oxide (ITO), antimony tin oxide (ATO), zinc oxide (ZnO), zinc dioxide ($ZnO_2$), tin dioxide ($SnO_2$), or indium trioxide ($In_2O_3$), and the conductive layer is patterned.

12. The touch stack-up structure as claimed in claim 1, wherein the refractive index of the covering layer is close to the refractive index of the third refractive index layer.

13. The touch stack-up structure as claimed in claim 1, wherein said touch stack-up structure is applied in a touch device, which forms a touch panel with a display device.

14. A method of forming a touch stack-up structure on a substrate, comprising the steps of:
   forming a conductive layer on said substrate;
   depositing a first refractive index layer to cover said conductive layer, wherein refractive index of said first refractive index layer is lower than refractive index of said conductive layer;
   depositing a second refractive index layer to cover said first refractive index layer, wherein refractive index of said second refractive index layer is higher than refractive index of said first refractive index layer;
   depositing a third refractive index layer directly on the second refractive index layer, wherein the refractive index of the third refractive index layer is lower than the refractive index of the second refractive index layer; and
   depositing a covering layer on the third refractive index layer;
   wherein the third refractive index layer has a first part and a second part, the first part and the second part have different cross-linking densities, wherein the first part is applicable for lamination with the covering layer made of glass and the second part is applicable for lamination with the second refractive index layer made of niobium pentoxide ($Nb_2O_5$) or silicon nitride ($SiN_x$).

\* \* \* \* \*